US009633338B2

(12) United States Patent
Brauninger et al.

(10) Patent No.: US 9,633,338 B2
(45) Date of Patent: *Apr. 25, 2017

(54) OUT OF OFFICE MESSAGE IMPROVEMENTS

(71) Applicant: Microsoft Technology Licensing, LLC, Redmond, WA (US)

(72) Inventors: Andy Brauninger, Seattle, WA (US); Aaron Hartwell, Duvall, WA (US); Jason Mayans, Bothell, WA (US); Alvin Mok, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/705,303

(22) Filed: May 6, 2015

(65) Prior Publication Data

US 2015/0235178 A1 Aug. 20, 2015

Related U.S. Application Data

(63) Continuation of application No. 13/617,657, filed on Sep. 14, 2012, now Pat. No. 9,064,244, which is a continuation of application No. 11/565,245, filed on Nov. 30, 2006, now Pat. No. 8,903,055.

(51) Int. Cl.
*H04M 1/64* (2006.01)
*G06Q 10/10* (2012.01)

(52) U.S. Cl.
CPC ....... *G06Q 10/107* (2013.01); *G06Q 10/1095* (2013.01)

(58) Field of Classification Search
CPC . G06Q 10/107; G06Q 10/109; G06Q 10/1095
USPC ............................ 379/88.22; 709/206; 705/9
See application file for complete search history.

(56) References Cited

U.S. PATENT DOCUMENTS

| 7,475,109 | B1 | 1/2009 | Fletcher et al. |
| 8,578,171 | B2 | 11/2013 | Adams et al. |
| 8,903,055 | B2 | 12/2014 | Brauninger et al. |
| 9,064,244 | B2 | 6/2015 | Brauninger et al. |
| 9,282,067 | B2 * | 3/2016 | Alfarano ................ H04L 51/02 |
| 2002/0152272 | A1 | 10/2002 | Yairi |

(Continued)

OTHER PUBLICATIONS

U.S. Appl. No. 11/565,245, Amendment and Response filed Oct. 5, 2011, 16 pgs.

(Continued)

*Primary Examiner* — Van D Huynh

(57) ABSTRACT

Embodiments of the present invention relate to set of improvements to the out of office assistant that send out of office messages to senders of messages while a recipient is out of the office. One embodiment of the out of office assistant associates an out of office message with a calendar event to ensure the out of office message is sent only for the predetermined time period associated with the calendar event. Other embodiments of the out of office assistant generating different messages to people internal to an organization and people external to an organization, and the out of office assistant allows different rich text formatting for the different messages. In a further embodiment, a persistent reminder reminds the user that the out of office message application is turned on.

20 Claims, 9 Drawing Sheets

(56) References Cited

U.S. PATENT DOCUMENTS

| | | | |
|---|---|---|---|
| 2004/0174964 A1 | 9/2004 | Koch | |
| 2004/0205653 A1 | 10/2004 | Hadfield et al. | |
| 2006/0105753 A1* | 5/2006 | Bocking | H04L 12/5895 455/417 |
| 2007/0192419 A1* | 8/2007 | Vuong | G06Q 10/107 709/206 |
| 2007/0244977 A1 | 10/2007 | Atkins | |
| 2008/0040177 A1* | 2/2008 | Vuong | G06Q 10/00 709/206 |
| 2008/0104177 A1* | 5/2008 | Keohane | G06Q 10/107 709/206 |

OTHER PUBLICATIONS

U.S. Appl. No. 11/565,245, Amendment and Response filed Dec. 16, 2013, 11 pgs.
U.S. Appl. No. 11/565,245, Amendment and Response filed May 27, 2014, 9 pgs.
U.S. Appl. No. 11/565,245, Amendment and Response filed May 4, 2012, 15 pgs.
U.S. Appl. No. 11/565,245, Notice of Allowance mailed Sep. 10, 2014, 9 pgs.
U.S. Appl. No. 11/565,245, Notice of Allowance mailed Sep. 26, 2014, 2 pgs.
U.S. Appl. No. 11/565,245, Office Action mailed Jan. 5, 2012, 14 pgs.
U.S. Appl. No. 11/565,245, Office Action mailed Mar. 12, 2014, 8 pgs.
U.S. Appl. No. 11/565,245, Office Action mailed Jun. 8, 2011, 12 pgs.
U.S. Appl. No. 11/565,245, Office Action mailed Sep. 16, 2013, 7 pgs.
U.S. Appl. No. 13/617,657, Amendment after Allowance filed Mar. 19, 2015, 3 pgs.
U.S. Appl. No. 13/617,657, Amendment and Response filed Dec. 11, 2014, 12 pgs.
U.S. Appl. No. 13/617,657, Amendment and Response filed May 27, 2014, 16 pgs.
U.S. Appl. No. 13/617,657, Notice of Allowance mailed Feb. 26, 2015, 8 pgs.
U.S. Appl. No. 13/617,657, Notice of Allowance mailed Apr. 28, 2015, 2 pgs.
U.S. Appl. No. 13/617,657, Office Action mailed Feb. 27, 2014, 11 pgs.
U.S. Appl. No. 13/617,657, Office Action mailed Sep. 11, 2014, 10 pgs.
U.S. Appl. No. 13/617,657, USPTO Response mailed Apr. 16, 2015, 2 pgs.

\* cited by examiner

OUT OF OFFICE MESSAGE IMPROVEMENTS

CROSS-REFERENCE TO RELATED APPLICATIONS

This application is a continuation application of U.S. patent application Ser. No. 13/617,657 (now U.S. Pat. No. 9,064,244), entitled "OUT OF OFFICE MESSAGE IMPROVEMENTS," filed on Sep. 14, 2012, which application is a continuation application of U.S. patent application Ser. No. 11/565,245 (now U.S. Pat. No. 8,903,055), filed on Nov. 30, 2006, the entire disclosures of which are hereby incorporated herein by reference.

BACKGROUND

Out of office (OOF) messages are generally sent, by an email or other messaging program, to alert a sender of a message that the message recipient is not available or "out of the office." Typically, the out of office message application, in the email program, is turned on when a person leaves his or her office, and the person turns off the out of office message application after returning to the office. Unfortunately, users often forget to turn off or turn on the out of office message application. The oversight by the user can lead to misinforming message senders of the status of the user.

SUMMARY

Embodiments of the present invention generally relate to improvements to an out of office assistant.

In one embodiment, an out of office assistant associates an out of office message with a calendar event to ensure the out of office messages are sent only for the predetermined time period of the calendar event. Further embodiments relate to generating and sending different messages to people internal to an organization and people external to an organization, and more particularly, to defining people internal to an organization. In additional embodiments, the out of office messages are formatted in a rich text format, e.g., HTML, and may be formatted differently for the internal and external people. In still further embodiments, a persistent reminder reminds the user that the out of office message application is turned on. Embodiments of the present invention comprise systems, methods, user interface elements, and data structures that effectuate the embodiments of the out of office improvements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

This disclosure will now more fully describe some embodiments with reference to the accompanying drawings, in which only some of the possible embodiments are shown. Other aspects may, however, be embodied in many different forms and should not be construed as limited to the embodiments set forth herein. Rather, these embodiments are provided so that this disclosure will be thorough and complete and will fully convey the scope of the possible embodiments to those skilled in the art.

Embodiments of the present invention relate to out-of-office assistants that provide user-friendly methods and systems for scheduling and customizing out of office messages. An out of office (OOF) message generally is a message, such as an email message, which is sent in reply to a received message and which alerts the sender of the received message that the recipient is "out of the office." For example, a user may be on vacation from November 22 through December 2. The user may like to alert anyone trying to contact him or her that he or she will not be able to respond to a sent message. The user can enter the message "I will be out of the office from November 22 to December 2 and will respond to any messages when I return." that will be sent to the people trying to contact him. Then, the user's email program, or other messaging program, sends the out-of-office message in reply to anyone that sends a message to the user during the time period when the out of office message is active, such as from November 22 to December 2.

Figure 1A:
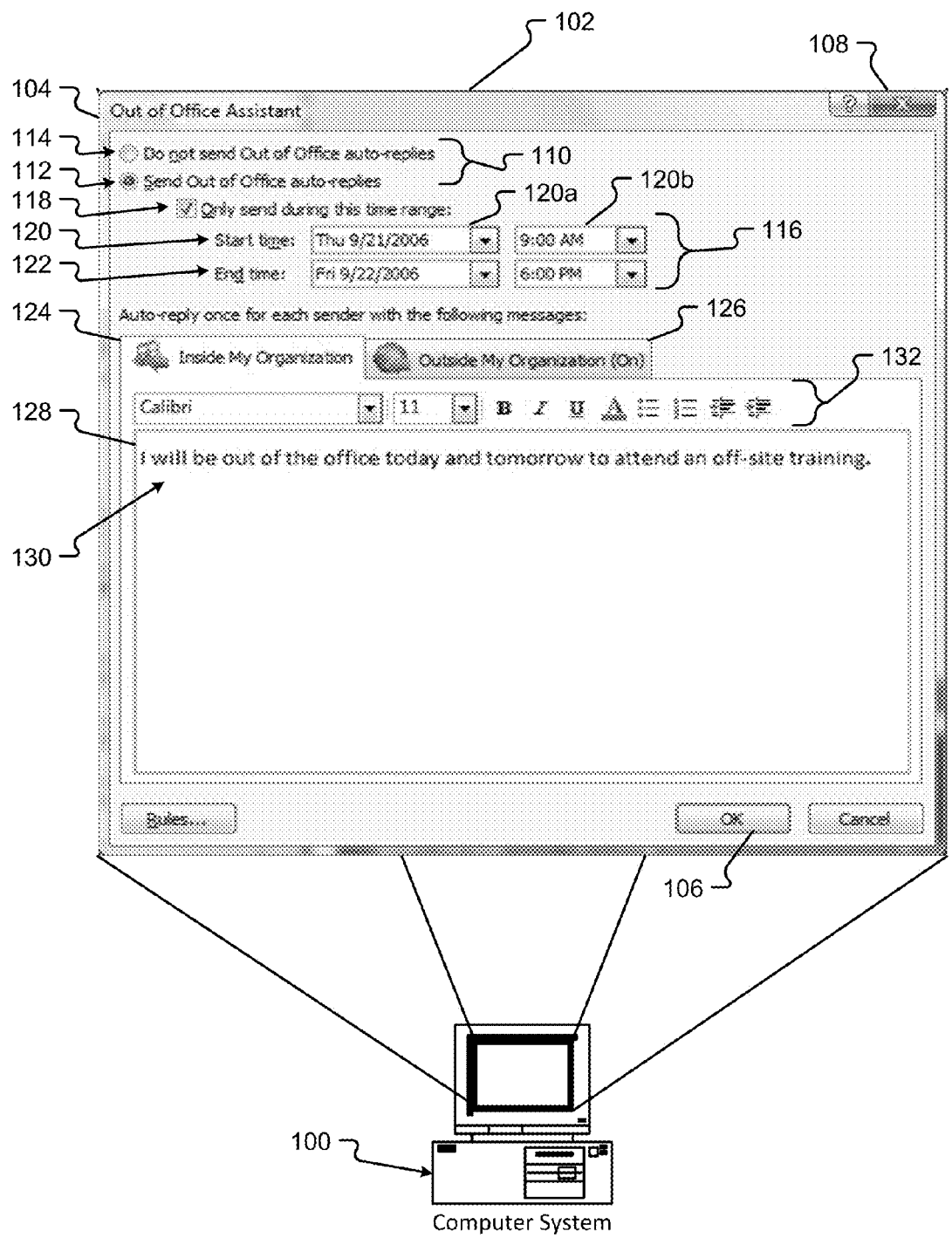
FIG. 1A is an embodiment of a display of an out of office assistant providing out of office messages and out of office message formatting.
Figure 1B:
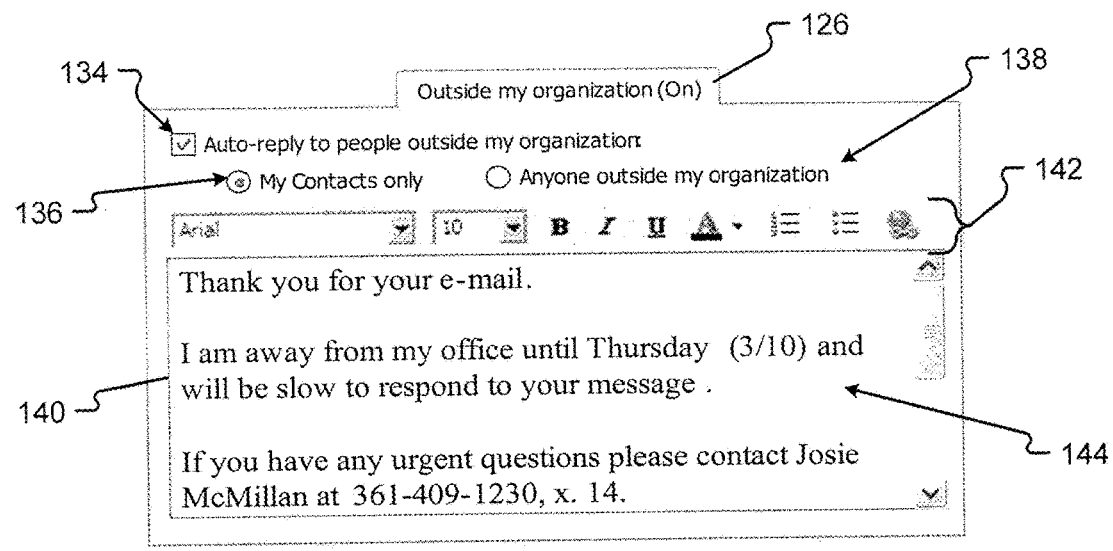
FIG. 1B is a further embodiment of a display of an out of office assistant providing a second out of office message for a second group of recipients.

An embodiment of a computer system 100 displaying an out-of-office assistant 102 is shown in FIG. 1A, with an embodiment of a further display 126 shown in FIG. 1B. In embodiments, an out-of-office assistant 102 provides a user of the computer system 100 with options to send an out-of-office message, to schedule when to send one or more out-of-office messages, to format the one or more out-of-office messages, and to customize the one or more out-of-office messages for one or more different recipients. The out-of-office assistant 102 is, in embodiments, a window including a title bar 104 and one or more controls, such as selectable buttons 106 and 108. In one embodiment, the computing system 100 presents the user with the out of office assistant 102 upon entering a calendar event in a calendar component of a personal organizer, like Microsoft® Office® Outlook®.

A first set of controls 110 accepts input from a user through a mouse or other user interface device. The first set of controls 110, in embodiments, accepts input as to whether an out of office auto reply message is to be sent. In the exemplary embodiment shown in FIG. 1, a user selects the radio button 112 to activate out of office auto-replies, while the user selects the radio button 114 not to send out of office auto-relies. By receiving the selection of the radio button 112, the computing system 100 accepts input that the out of office messages should be sent. In a further embodiment, selection of the radio button 112 also associates the out of office messages with a calendar event input into the calendar.

A second set of controls 116, in embodiments, accepts user input as to whether there is a time period for which the out of office messages are to be sent. By setting a check box 118 in the exemplary embodiment of FIG. 1, the user specifies that the out of office auto-reply messages are to be sent only during a specified time period. In embodiments, the time period is designated by a start time and an end time, but, in at least one embodiment, the time period is designated by only a start time or an end time. A pair of drop down menus 120 allows the user to input the start time. The first drop down menu 120a allows a user to enter the date at which the out of office messages should start being sent. A second drop down menu 120b allows the user to set the time, during the day set with drop down menu 120a, at which the out of office messages should start being sent. A similar pair of drop down menus 122 allows the user to set the date and time when the out of office messages should cease being sent. In further embodiments, the start time displayed in user interface elements 120 or the end time displayed in user interface element 122 are automatically entered from the start time and end time of an associated calendar event.

In other embodiments, a first tab 124 exposes an embedded window 128 that allows a user to enter the text 130 of an out of office message. The first tab 124 allows a user to enter a message for a predetermined group of recipients. In one embodiment, the first group of recipients are people that are "Inside my Organization" as indicated by the title of the first tab 124. The people included in the first group of recipients may be determined by the organization using the out of office assistant or by another entity. For example, the organization indicates that only those people with the same domain, e.g., "@microsoft.com," are part of the first group of recipients that will receive the out of office message entered in window 128. Other methods for defining the first group of recipients are possible including designating all people listed in both a Global Address List (GAL), which is a list of email addresses maintained by a server email system, for example, Microsoft® Exchange®, and/or the user's contacts folder, for example, in the user's contacts folder of Microsoft® Office® Outlook®.

A next set of controls 132 can comprise controls to change the formatting of the text of the out of office message 130. Embodiments of out of office assistant 102 allows for rich text formatting of the out of office messages. Rich text formatting, e.g., HTML, can be formatting for different fonts, font sizes, font colors, bullets, highlighting, etc. The controls 132 comprise controls can change the font, font size, bolding, italics, underlining, font color, bullets, indentions, etc. The set of controls 132 can be associated with the first out of office message 130. In embodiments, the first out of office message 130 sent to the first group of recipients has different text and formatting compared to a second out of office message sent to a second group of recipients.

A second tab 126 can expose a second window 140, shown in FIG. 1B, that accepts a second out of office message 144 from the user. If a user desires to send the second out of office message 144 to a second group of recipients, the user selects the check box user interface control 134 to indicate that the use wants to send different OOF messages to different groups of recipients. The second out of office message 144, in embodiments, is sent to a second group of recipients. In an embodiment, the second group of recipients includes all recipients not part of the first group of recipients described above, i.e., all recipients that are not internal to the organization. In other embodiments, the user designates the second group of recipients by selecting radio button 136 or radio button 138. Selecting radio button 138 indicates that the second group of recipients includes all recipients within a different domain. In another embodiment, selecting radio button 136 indicates that the second group of recipients is the contacts or members of the user's contact folder in the email system. More groups of recipients are specified and other tabbed windows exposed in other embodiments. Controls 142, in embodiments, allow for different rich text formatting and other formatting for the second OOF 144.

Figure 2:
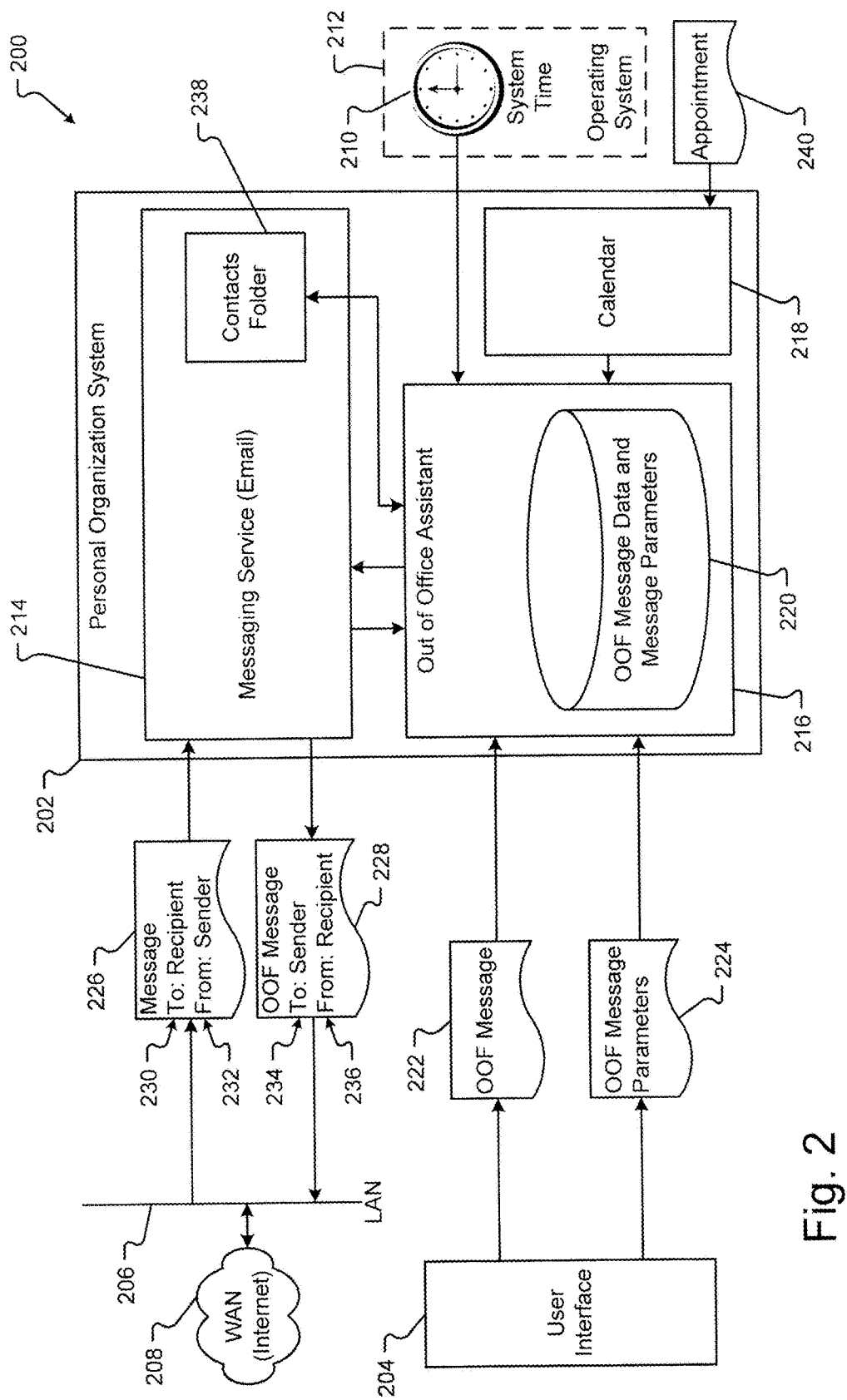
FIG. 2 is a function diagram illustrating an embodiments of a system operable to provide an out of office assistant that creates and sends out of office messages.

A system 200 for generating OOF messages 228 and sending the OOF messages 228 is shown in FIG. 2. The system 200 may be embodied in hardware, software, or a combination of hardware and software. In one embodiment, the system 200 is one or more software components embodied in at least one tangible computer readable medium, as explained in conjunction with FIG. 9, and executable on a computing system to generate, customize, or send OOF messages 228. The system, in embodiments, comprises one or more of a personal organization system 202, a user interface 204, an optional local area network (LAN) 206, a connection to a wide area network (WAN) 208, such as the Internet, and a system time component 210, which may optionally be part of an operating system 212. The personal organization system 202 is, in embodiments, in electrical communication with or communicatively coupled to the LAN 206 or the WAN 208, the user interface 204, and the system time component 212.

The LAN 206 or WAN 208 is, in embodiments, any system or method that connects together two or more computers that allows the computer to communicate with each other. LANs and WANs are well known in the art and will not be explained further. Embodiments of the system time component 210 are any hardware device or software component that maintains the current date and time for a computing system 100 (FIG. 1A and FIG. 1B). The optional operating system 212 is any embodiment of an operating system that functions as a software platform for one or more other software applications. An exemplary operating system 212 is the Microsoft® XP® operating system offered by Microsoft® Corporation of Redmond, Wash.

An exemplary embodiment of the personal organization system 202 is the Microsoft® Office® Outlook® software program offered by Microsoft® Corporation of Redmond, Wash. In embodiments, the personal organization system 202 comprises an out of office assistant component 216 and, in further embodiments, includes a messaging service 214 and a calendar component 218. The out of office assistant component 216 is in electrical communication with or communicatively coupled to the messaging service 214 and the calendar component 218. In other embodiments, the personal organization system 202 includes one or more other components, such as a contact's folder component 238, a tasks list component (not shown), a notes component (not shown), a journal component, etc.

In operation, the personal organization system 202 can create, store and send OOF messages. The out of office assistant 216, in embodiments, accepts a request to create an OOF message from either the calendar component 218 or the user interface 204. In one embodiment, a user sets an appointment 240 in the calendar component 218. In response to setting the appointment 240, the out of office assistant presents a window, for example, window 102 (FIG. 1A and FIG. 1B), to the user to create an OOF message associated with the appointment 240. The user can select whether an OOF message should be sent during the time period of the appointment 240. If the user does desire an OOF message to be sent, the start time 120a (FIG. 1A and FIG. 1B) and end time 120b (FIG. 1A and FIG. 1B) are automatically set by importing the start time and end time of the appointment 240 set in the calendar component 218. The user may then set other OOF message parameters as needed for the OOF message associated with the calendar appointment 240 and enter the text of the OOF message. In another embodiment, one or more parts of the text of the OOF message are automatically created with properties of the calendar appointment 240. For example, a user can set the type of appointment, for example, meeting, vacation, personal, etc., and/or set the location of the user, for example, Tahiti, Boston, etc. The automatically generated message can use the properties for parts of the text. For example, the text of the automatically generated OOF message may read "I will be on *vacation* in *Tahiti* for *1/1/07* to *1/20/07*," wherein all italicized text is automatically generated from calendar appointment properties.

In another embodiment, a user requests, using the user interface 204, to create an OOF message. The out of office assistant 216 presents, in embodiments, a window 102 (FIG. 1A and FIG. 1B), to enter the OOF message 222 and the message parameters 224 as explained in conjunction with FIG. 1A and FIG. 1B. Regardless of the method used to request or create the OOF message and the message parameters, the OOF message and the OOF message parameters are stored in a datastore 220. In embodiments, the datastore 220 is a subcomponent of the out of office assistant 216 or a messaging service 214 executing on a server, for example, Microsoft® Exchange® Server but, in other embodiments, is a separate datastore not associated with the out of office assistant 216 or the messaging service 214.

To execute the OOF message 228 as specified by the user, embodiments of the messaging service 214 receives a first message 226 from a sender 232 and addressed to the recipient 234. Upon receiving a received message 226, the messaging service 214 accesses the stored OOF messages 222 and OOF message parameters 224 from the database 220.

In one embodiment, the messaging service 214 determines if any out of office message is active. For example, the user may have set an out of office message to be sent without specifying when the out of office message was to be sent. In this example, the out of office message is active until the user terminates the out of office message. Other embodiments of the messaging service 214 determines if any OOF message has a time period in which the OOF message is supposed to be sent. If one or more OOF messages do have a time period set in the message parameters 224, the messaging service 214 determines the current date and time sent by the system time component 210. By comparing the current date and time with the start time and end time in the OOF message parameters as explained in more detail in conjunction with FIG. 4, the messaging service 214 determines whether the message 226 was received within the specified time period. If the message 226 was received within the specified time period, the OOF message, with the parameter set with the specified time period, is active. It should be appreciated that the one or more steps described herein may be performed in one or more other sequences. For example, the user may create an OOF message, and the message may be stored in the datastore. The OOF message may then become active. A messaging service 214 may receive a message at which time the messaging service 214 can check if an OOF message is active. If a message is active, the OOF message may be accessed from the datastore and sent.

In another embodiment, the messaging service 214 periodically, or upon initialization of the personal organization system 202, polls the system time component 212 for the current date and time. The messaging service 214 compares the current date and time to any date and time specified in the OOF message parameters 224 stored in datastore 220. If the current date and time are within a time period specified by any OOF message parameters 224, a flag is set to alert the messaging service 214 should respond to all received messages 226 with the OOF message 228. It is appreciated that a flag is any bit or software operation that indicates or stores a status of a software component.

Embodiments of the messaging service 214 sends the OOF message if any OOF message is active. The message retrieved by the messaging service 214, in embodiments, includes the text of the OOF message and one or more message parameters needed by the messaging service 214 to prepare the OOF message. For example, the messaging service 214 determines whether there is a first message for a first group of recipients and a second message for a second group of recipients because the messaging service 214 would need to construct two OOF messages. In further examples, the messaging service 214 would need to know any formatting for the OOF message.

Upon receiving the OOF message and OOF message parameter data, embodiments of the messaging service 214 construct the OOF message and sends the OOF message 228. In embodiments, the sender 232 of the received message 226 becomes the recipient 234 of the OOF message 228. Likewise, the recipient 230 of the received message 226 becomes the sender 236 of the OOF message 228. The messaging service 214 continues to send OOF messages 228 as long as any OOF message is active.

Figure 3:
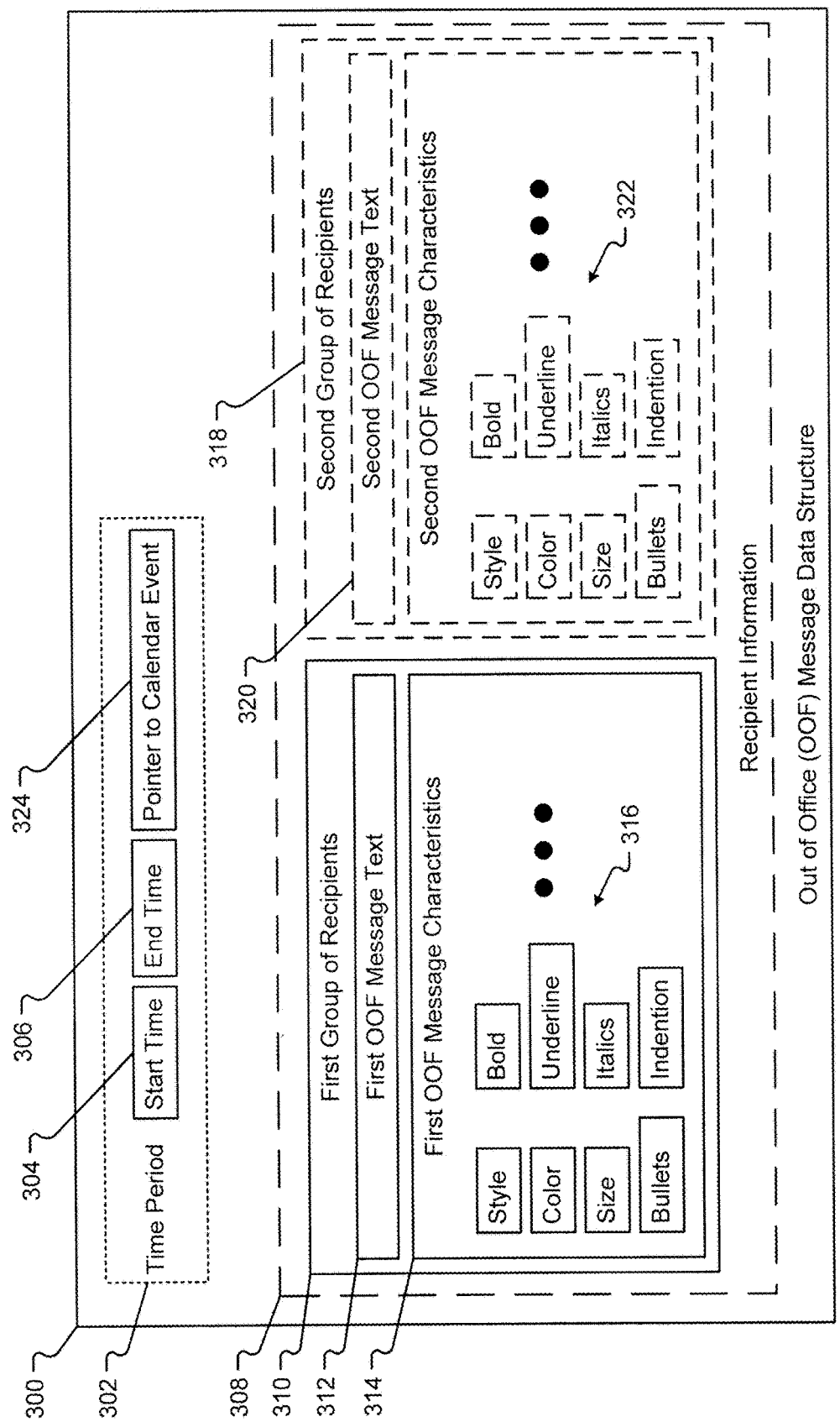
FIG. 3 is a block diagram of an embodiment of a data structure for storing out of office messages and out of office parameters and characteristics.

An embodiment of an OOF message data structure 300 is shown in FIG. 3. In one embodiment, the OOF message data structure 300 comprises at least a first OOF message text data field 312. The first OOF message text data field 312 includes the text used in the OOF message 228 (FIG. 2). In embodiments, the text in the first OOF message text data field 312 is entered by the user or is automatically generated by the out of office assistant 202 (FIG. 2). For example, an automatic OOF message may read "the recipient is currently out of the office."

In further embodiments, the OOF message data structure 300 comprises an optional time period data field 302, which stores the time period in which the OOF message is to be sent. The time period data field 302 is not required because the user may manually turn on the OOF message without scheduling a time period for the OOF message. The data in the time period data field 302 is read and instructs the out of office assistant 202 (FIG. 2) when to direct a message service 214 (FIG. 2) to send the OOF message. In one embodiment, the time period data field 302 comprises a start time data field 304. The start time data field 304 establishes the date and time at which the OOF messages should start to be sent. An optional end time data field 306 may also be included in the time period data field 302. The end time data field 306 establishes the time at which the OOF messages should no longer be sent.

In further embodiments, a pointer to a calendar event 324 is set in the time period data field 302. The pointer to a calendar event 324 stores a software data structure that associates the OOF message data structure 300 with an event in a calendar. Thus, when the calendar event changes, for example, the time or date of the calendar event changes, the pointer to the calendar event 324 determines that changes have been made and allows the importation of new parameters, e.g., start time and end time.

Another embodiment of the OOF message data structure 300 comprises a recipient information data field 308. If a user desires to send different OOF messages to different recipients, the recipient information data field 308 comprises the data with which to determine the different recipients and the targeted OOF message data for those recipients. For example, if a first OOF message is to be sent to a first group of recipients, a first group of recipients data field 310 comprises the data for first OOF message and the first group of recipients. In one embodiment, the first group of recipient data 310 includes a listing of one or more people included in the first group of recipients. In another embodiment, the first group of recipient data 310 includes a pointer to a datastore that defines the people in the first group of recipients. For example, the pointer points to the contacts folder in the email system of the user. The out of office assistant 202 (FIG. 2), in embodiments, compares the sender information 232 (FIG. 2) of the received message 226 (FIG. 2) with recipient data in the first group of recipient data 310 to determine if the sender is part of the first group of recipients and should receive the first OOF message.

The first group of recipient data 310 may also include other information. In one embodiment, the first OOF message text data field 312 described above may be part of the first group of recipient data 310. In further embodiments, the first OOF message characteristics data field 314 is also included in the first group of recipient data 310. The first OOF message characteristics data field 314 may contain one or more items of data describing the formatting or other characteristics of the first OOF message. In embodiments, the first OOF message characteristics data 314 includes designations for font style, font size, font color, bolding, underlining, italics, indention, bullets, etc., as generally designated at 316.

If the user designates that there are more than one OOF message for more than one group of recipients, the recipient information data field 308, in embodiments, includes at least a second group of recipient data 318. Like the first group of recipient data, the second group of recipient data 318 can comprise a second OOF message text data field 320 and a second OOF message characteristics data field 322. The second OOF message text data field 320 and the second OOF message characteristics data field 322 contain similar information as the first OOF message text data field 312 and the first OOF message characteristics data field 314, respectively. The information in the second OOF message characteristics data field 322 is generally designated by 322. Unlike the first group of recipient data 310, embodiments of the second group of recipient data 318 may not contain information about people included in the second group of recipients. Instead, the second group of recipients may be a default group for all senders 230 (FIG. 2) not part of the first group of recipients. However, in other embodiments, if there is a third group of recipients defined in a third group of recipient data (not shown), the second group of recipient data 318 designates the particular people in the second group of recipients.

Figure 4:
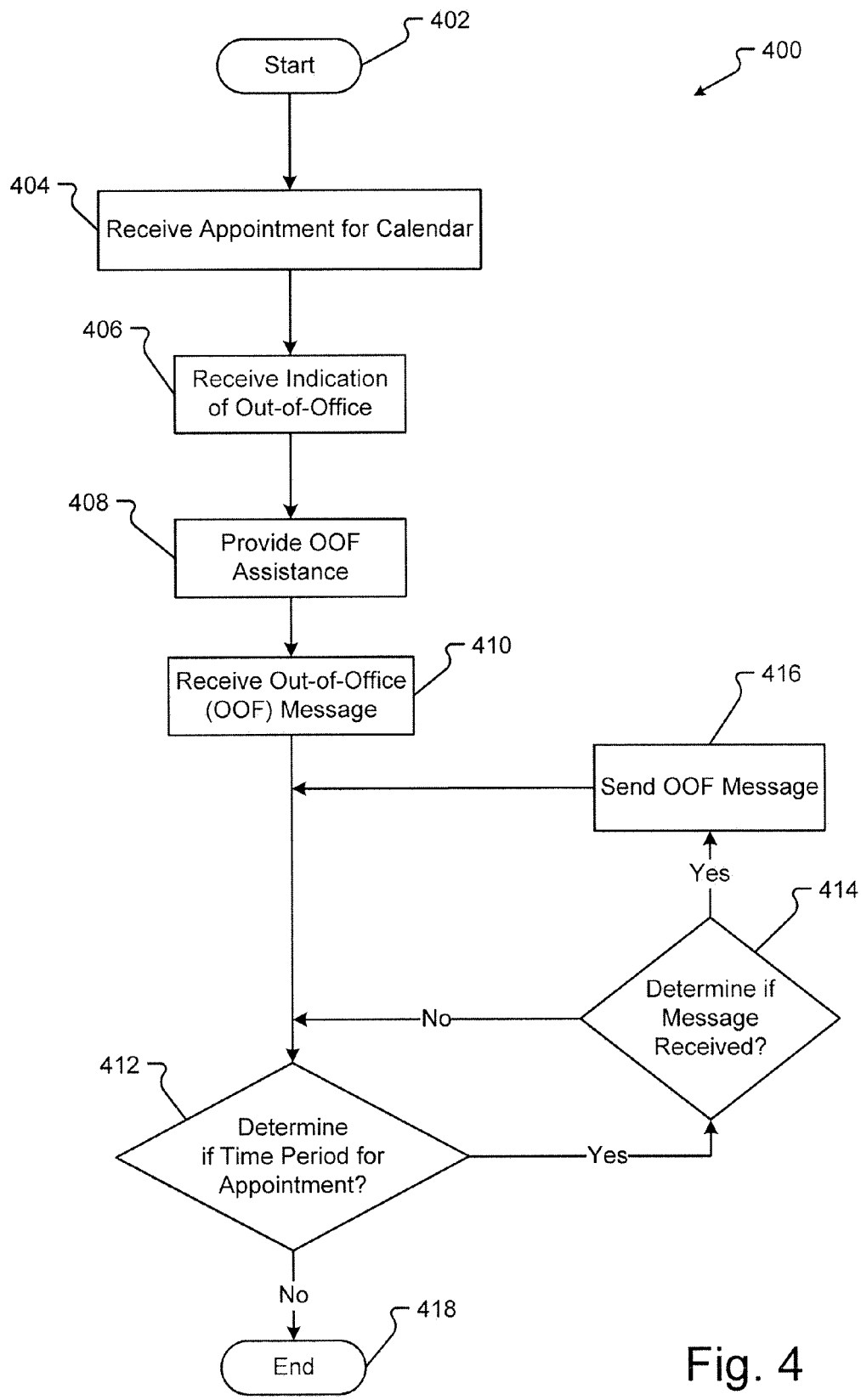
FIG. 4 is a flow diagram representing an embodiment of a method for associating a calendar event with an out of office message.

An embodiment of a method 400 for scheduling an out of office message associated with a calendar event is shown in FIG. 4. Generally, the method 400 begins with a start operation 402 and terminates with an end operation 418.

Upon starting the method 400 with the start operation 402, receive operation 404 receives an appointment. In one embodiment, the appointment is entered into a calendar 218 (FIG. 2). The calendar appointment may have one or more appointment parameters, for example, the start time or end time of the appointment, one or more out of office (OOF) messages 222 (FIG. 2) and one or more OOF message parameters 224 (FIG. 2). In embodiments, the OOF message is similar to the OOF message 140 (FIG. 1) as shown in the window 128 (FIG. 1). OOF message parameters may be one or more parameters received from the user, which dictate the function of the out of office auto-reply messages. For example, the parameters can include the time period in which the OOF message is to be sent, the designation of a first OOF message for a first group of recipients, the designation of a second OOF message for a second group of recipients, and/or the formatting of the one or more OOF messages. The one or more OOF messages and the OOF message parameters, in embodiments, are stored for use when the one or more OOF messages are to be sent.

Receive operation 406 receives indication that an out of office message will be associated with the appointment. In one embodiment, a user indicates that an OOF message is associated with the appointment by selecting a user interface control in the calendar 218 (FIG. 2). Other embodiments of the calendar 218 (FIG. 2) automatically indicates that an OOF message can be associated with the appointment and requires the user to "deselect" the out of office message option. In response to receiving indication that an out of office message is associated with the appointment, provide operation 408 provides out of office assistance. In one embodiment, the OOF assistant 102 (FIG. 1) is provided to the user to enter OOF messages and OOF message parameters.

Receive operation 410 receives one or more out of office messages 222 (FIG. 2) and one or more OOF message parameters 224 (FIG. 2). In embodiments, the OOF message is similar to the OOF message 140 (FIG. 1), as shown in the window 128 (FIG. 1). Message parameters are one or more parameters received from the user, which dictate the function of the out of office auto-reply messages. For example, the parameters include the time period in which the OOF message are to be sent, the designation of an first OOF message for a first group of recipients, the designation of a second OOF message for a second group of recipients, and/or the formatting of the one or more OOF messages. The one or more OOF messages and the OOF message parameters, in embodiments, are stored in a datastore 220 (FIG. 2) for use when the OOF messages are to be sent.

In one embodiment, the OOF message parameters include a time period for when the OOF messages are to be sent, and the time period is associated with time set for the calendar appointment. Thus, when the appointment in the calendar begins, the OOF messages begin being sent. Likewise, when the appointment in the calendar ends, the OOF messages stop being sent. In one embodiment, the times set for the appointment are imported into the OOF message parameters for the OOF message. A pointer, object linking and embedding (OLE) software device or other software construct may associate the OOF message parameters with the calendar event. Thus, if the time for the appointment is changed in the calendar, the OOF message parameters are also automatically changed.

Determine operation 406 determines if the current time is within the time period specified in the OOF message parameters. For example, the determine operation 406 retrieves the current date and time from a system time component 210

(FIG. 2) of the operating system 212 (FIG. 2) of the computing system 100 (FIG. 1). In one embodiment, determine operation 406 compares the current date and time to the start time entered into the drop down menu 120a (FIG. 1). If the current date and time is after the start time, determine operation 406 compares the current date and time to the end time entered into the drop menu 120b (FIG. 1). If the current date and time is before the end time, then the current date and time is within the time period for the OOF messages, and the method flows Yes to determine operation 408. If the current date and time is either before the start time or after the end time, the method flows No to the end operation 404. In one embodiment, the OOF assistant sets a flag that alerts the messaging service that OOF message are to be sent.

If a current date and time is within the time period for the OOF messages, determine operation 408 determines if a message 226 (FIG. 2) has been received. In one embodiment, the messaging service 214 (FIG. 2) sends a signal to the out of office assistant 216 (FIG. 2) that a message has been received. In another embodiment, the out of office assistant 216 (FIG. 2) polls the messaging service 214 (FIG. 2) to determine if a new message is in the inbox and was received at approximately the current date and time. If there are no new messages received, the method flows No to determine operation 406. If there is a new message received, the method flows Yes to send operation 410. In another embodiment, with the OOF flag set, the messaging service automatically responds to all received messages by sending the OOF message. Send operation 410 sends the OOF message 228 (FIG. 2) to the sender 234 (FIG. 2) of the new message 226 (FIG. 2).

Figure 5A:
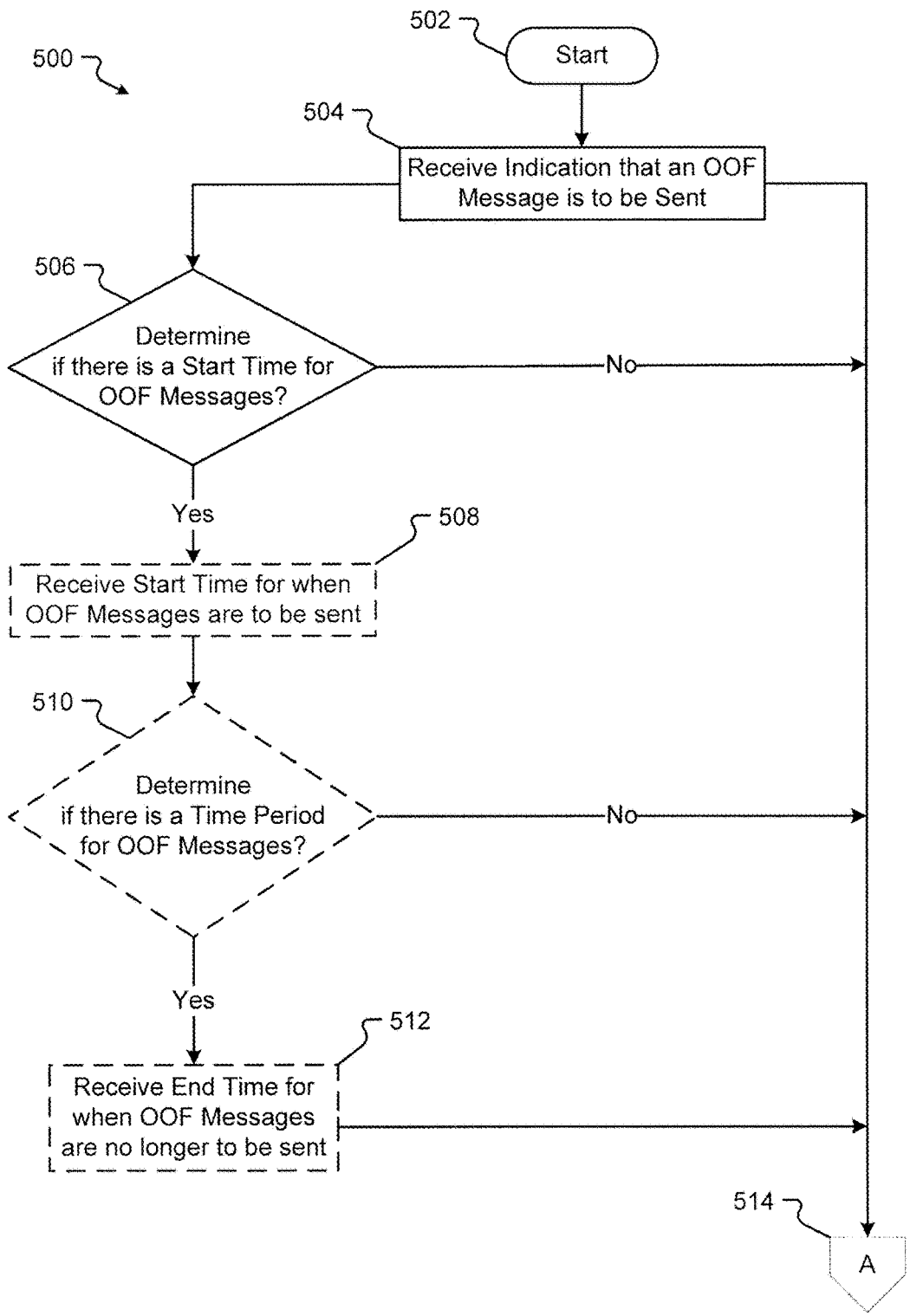
FIG. 5A and FIG. 5B is a flow diagram representing a further embodiment of a method for creating one or more out of office messages and inputting out of office message parameters.
Figure 5B:
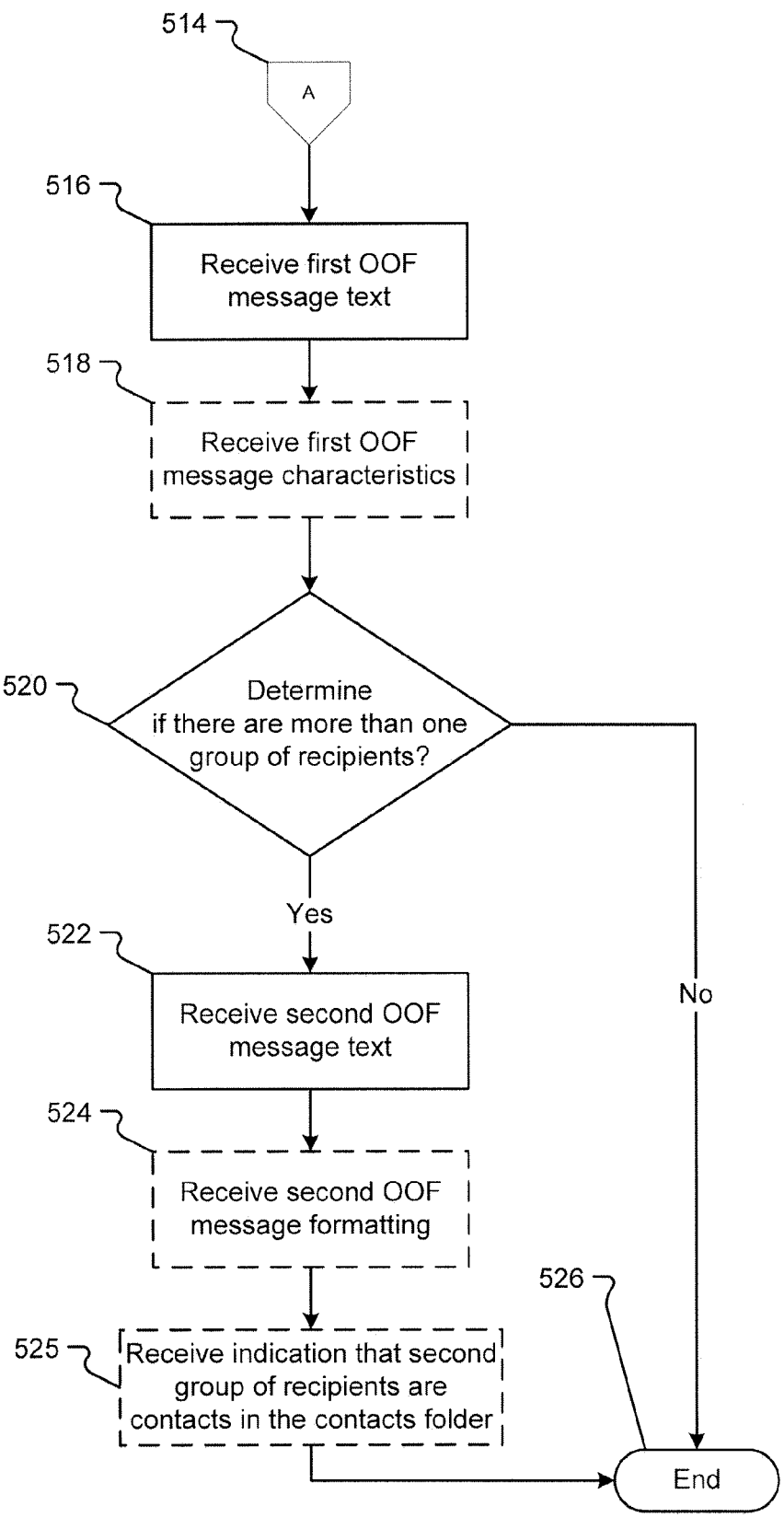

An embodiment of a method 500 for receiving OOF message parameters 224 (FIG. 2) is shown in FIGS. 5A and 5B. Generally, the method 500 begins with a start operation 502 and terminates with an end operation 526. Upon starting the method 500 with the start operation 502, receive operation 504 receives an indication that an OOF message is to be sent. In one embodiment, a user selects a user interface control, for example, user interface control 112 (FIG. 1), which indicates that the user wants to send an OOF message. Upon receiving the indication that the user wants to send an OOF message, one embodiment of the process 500 flows through reference A 514 to receive operation 516. In another embodiment, the process 500 flows to determine operation 506, which determines if there is a start time for the OOF message. A user may enter the start time in a user interface control, for example, drop down menus 120a (FIG. 1A) and 120b (FIG. 1A), by which an out of office assistant 216 (FIG. 2) determines that there is a start time for the OOF message. In another embodiment, the user sets a calendar event in a calendar component 218 (FIG. 2). After setting the calendar event, the user may select a user interface control to associate an OOF message with the calendar event. If the user associates the calendar event with an OOF message, the out of office assistant 216 (FIG. 2) determines that there is a start time for the OOF message, which corresponds to the start time of the calendar event. If there is a start time, the process 500 flows Yes to receive operation 508. If there is no start time, the process 500 flows No through reference A 514 to receive operation 516.

Receive operation 508 receives the start time for the OOF message. As explained in conjunction with FIG. 1A, FIG. 1B and FIG. 2, the start time may be entered by the user through a user interface element 120a (FIG. 1A) or may be input from the start time of an associated calendar event in a calendar 218 (FIG. 2). In one embodiment, the out of office assistant 202 (FIG. 2) stores the start time in the start time data field 304 (FIG. 3) of the OOF message data structure 300 (FIG. 3), which is stored in the datastore 220 (FIG. 2).

Determine operation 510 determines if there is a time period for the OOF message. In one embodiment, if a user enters a value as an end time in a user interface element 120b (FIG. 1A), then determine operation 510 determines that there is a time period. In another embodiment, if the OOF message is associated with a calendar event, determine operation 510 determines that there is a time period that corresponds with the associated calendar event. If there is a time period, the process 500 flows Yes to receive operation 512, and, if there is no time period for the OOF message, the process flows No to reference A 514 and to receive operation 516.

Receive operation 512 receives an end time for the OOF message time period. The end time, in embodiments, is the date and time when the OOF messages should no longer be sent. As explained in conjunction with FIG. 1A, FIG. 1B and FIG. 2, the end time may be entered by the user through a user interface element 120b (FIG. 1A) or may be input from the end time of an associated calendar event in a calendar 218 (FIG. 2). In one embodiment, the out of office assistant 202 (FIG. 2) stores the end time in the end time data field 306 (FIG. 3) of the OOF message data structure 300 (FIG. 3), which is stored in the datastore 220 (FIG. 2). After receive operation 512, embodiments of the process 500 flows through reference connector A 514 to receive operation 516.

Figure 6A:
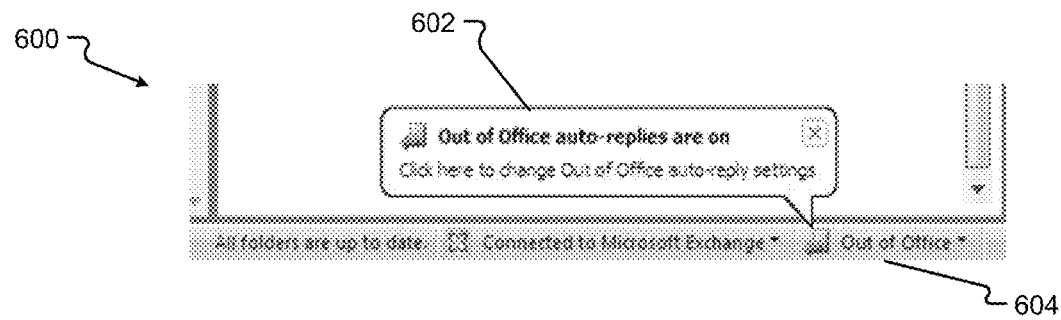
FIG. 6A, FIG. 6B and FIG. 6C are embodiments of displays indicating active out of office messages.
Figure 6B:
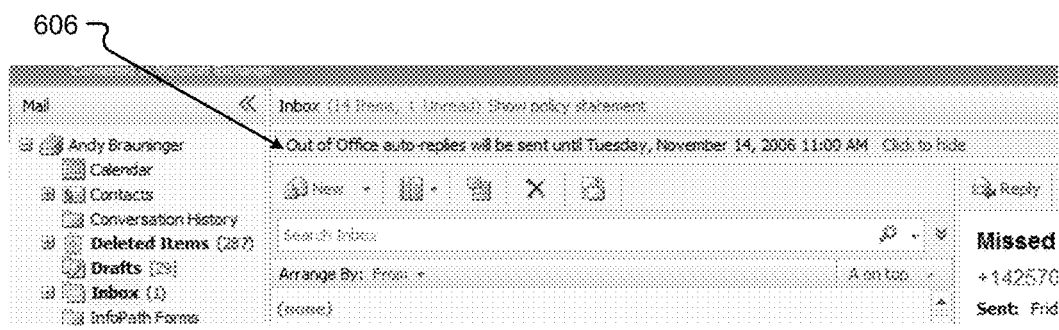

Receive operation 516, shown in FIG. 6B, receives the first OOF message text. The text received by the receive operation 516 is input into the first out of office message 228 (FIG. 2) sent by the message service 214 (FIG. 2) of the computing system 200 (FIG. 2). Again, as explained in conjunction with FIG. 1A, FIG. 1B and FIG. 2, the text may be entered by the user through a user interface element 128 (FIG. 1A). In one embodiment, the text message received is stored in the first OOF message text data field 312 (FIG. 3) of the OOF message data structure 300 (FIG. 3).

In embodiments, optional receive operation 518 receives one or more message characteristics 224 (FIG. 2) for the first OOF message. The message characteristics may be one or more formatting or other parameters entered through user interface elements 132 (FIG. 1) or stored in the message characteristics data field 314 (FIG. 3). For example, the message characteristics include bolding, highlighting, bulleting, or any other type of rich text formatting. In embodiments, the out of office assistant 202 (FIG. 2) stores the received message characteristics 224 (FIG. 2) in the first OOF message characteristics data field 314 (FIG. 3) of the OOF message data structure 300 (FIG. 3), which is stored in the datastore 220 (FIG. 2).

Determine operation 520 determines if there are more than one group of recipients for one or more OOF messages. For example, if the user enters a second OOF message into user interface element 126 (FIG. 1A), determine operation 520 determines there are two or more OOF messages for two or more groups of recipients. If there are two or more groups of recipients, the process 500 flows Yes to receive operation 522. If there is one group of recipients, the process flows No to end operation 526.

Receive operation 522 receives the second OOF message for the second group of recipients. The text received by the receive operation 522 is input into the second out of office message sent by the message service 214 (FIG. 2) of the computing system 200 (FIG. 2). Again, as explained in conjunction with FIG. 1A, FIG. 1B and FIG. 2, the text may be entered by the user through a user interface element 126 (FIG. 1B). In one embodiment, the text message received is stored in the second OOF message text data field 320 (FIG. 3) of the OOF message data structure 300 (FIG. 3).

In further embodiments, optional receive operation 524 receives one or more message characteristics for the second OOF message. The message characteristics may be one or more formatting or other parameters entered through user interface elements. For example, the message characteristics include bolding, highlighting, bulleting, or any other type of rich text formatting. In embodiments, the out of office assistant 202 (FIG. 2) stores the received message characteristics 224 (FIG. 2) in the first OOF message characteristics data field 314 (FIG. 3) of the OOF message data structure 300 (FIG. 3), which is stored in the datastore 220 (FIG. 2). In one embodiment, the message characteristics for the second OOF message also includes a definition of what people are included in the second group of recipients. For example, the user may select a user interface element to indicate that the second group of recipients is those people listed in the user's contacts folder.

In a further embodiment, optional receive operation 525 receives and indication that the second group or recipients are one or more contacts in a user's contacts folder. For example, the user selects a user interface element 136 (FIG. 1B) that instructs the out of office assistant 202 (FIG. 2) that the second group of recipients are the contacts in the contacts folder 238 (FIG. 2). In another example, the user selects user interface element 138 (FIG. 1B) that instructs the out of office assistant 202 (FIG. 2) that the second group of recipients are the people outside the organization, for example, those people with a different domain name.

Figure 6C:
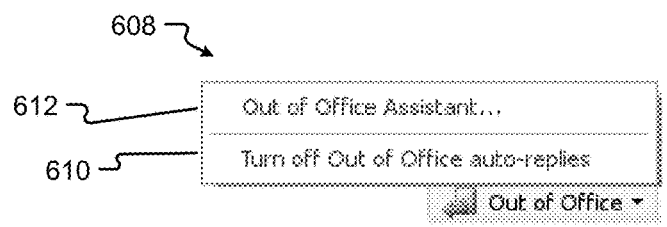

A problem with some out of office assistants is that there are either no indications or poor indications of when the out of office assistant is turned on. A set of user interface elements 600 that provide an indication to the user that the out of office assistant is currently on is shown in FIG. 6A, FIG. 6B and FIG. 6C. In one embodiment, the user interface element is a balloon 602 that appears to indicate to the user that the out of office auto-reply function is currently on. The balloon 602 may appear, for example, when the personal organization system 202 (FIG. 2) is first initiated (the user is OOF), after some period of time, for example, 24 hours, when a user's OOF turns on (while the personal organization system 202 is running), or when the user opens or views his or her email, etc.

In other embodiments, the user interface element that provides the persistent reminder that the out of office auto-reply function is currently operating is a box 604 in the status bar of the personal organization system 202 (FIG. 2) or a banner 606 placed in the user interface of the personal organization system 202 (FIG. 2) as shown in FIG. 6B. The persistent reminder message may provide different information. For example, the banner 606 shows that the out of office messages will be sent until a predetermined date and time corresponding to an end time. Thus, the banner 606 can provide information to the user that allows the user to turn off the OOF message earlier than the scheduled end time. Similarly, the box 604 may also provide information that allows the user to turn off the OOF message. It is to be appreciated that the persistent reminders 604 and 606 can remain visible regardless of the user's actions and for the duration of the execution of the personal organization system 202 (FIG. 2).

One or more of the user interface elements 602, 604 or 606, in embodiments, are selected to expose a pop-up menu 608. The pop-up menu 608 can allow the user to turn off the out of office messages by selecting a menu option 610 to turn off the OOF messages. In other embodiments, a menu selection 612 will expose the out of office assistant user interface 102 (FIG. 1A). Therefore, embodiments of the menu 608 provide an easy entry point into the out of office assistant 102 (FIG. 1A) that is itself easily accessed from the user interface elements 602, 604 or 606.

Figure 7:
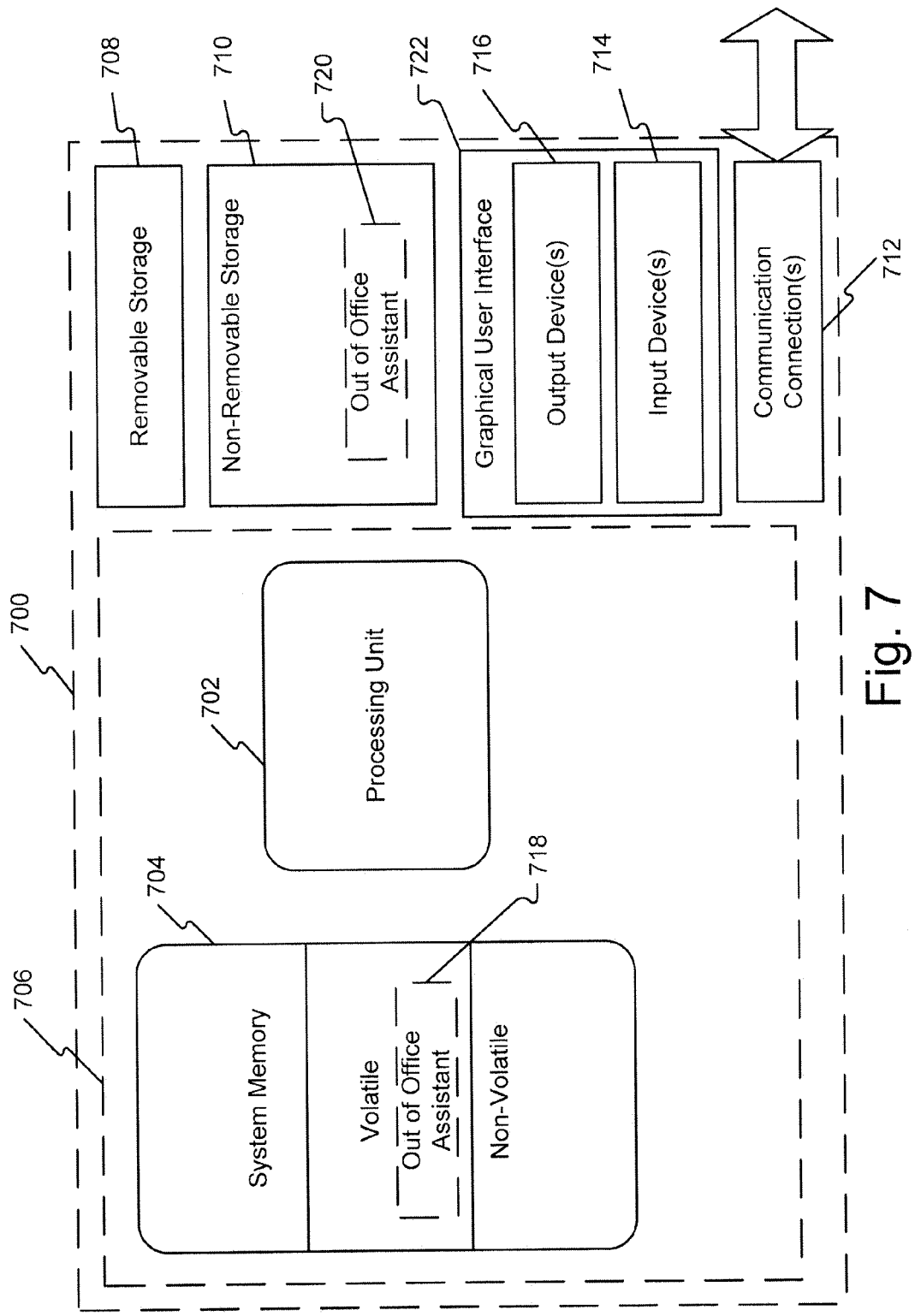
FIG. 7 is a block diagram representing an embodiment computing environment and computing system operable to execute out of office assistants.

With reference to FIG. 7, an embodiment of a computing environment for implementing the embodiments described herein includes a computer system, such as computer system 700. The creation, administration and transmission of out of office messages may be done on a client computer system, on a server computer system, on a combination of client and server computer systems, on a handheld device, and in other possible computing environments. In one embodiment, the client computer executes a personal organization system 202 (FIG. 2), for example, Microsoft® Office® Outlook®, while the messaging service 214 (FIG. 2), for example, Microsoft® Exchange® Server, executes on a server. As such, a basic computer system applicable to these environments is described hereinafter.

In its most basic configuration, computer system 700 typically includes at least one processing unit 702 and system memory 704. In embodiments, an out of office assistant 718 is loaded into and run by the processing unit 702 from system memory 704 of a client computer. Depending on the exact configuration and type of computer system 700, memory 704 may be volatile (such as RAM), non-volatile (such as ROM, flash memory, etc.), or some combination of the two. This most basic configuration of the computer system 700 is illustrated in FIG. 7 by dashed line 706.

Additionally, device 700 may also have additional features/functionality. For example, device 700 includes additional storage (removable and/or non-removable) including, but not limited to, magnetic or optical disks or tape. Such additional storage is illustrated in FIG. 7 by removable storage 708 and non-removable storage 710. In embodiments, an out of office assistant 720 is permanently stored in non-removable storage 710, although out of office assistant 720 may be saved into removable storage 708, and loaded into system memory 704 for execution by the processing unit 702 on the client. In some embodiments, the out of office assistant 720 is one or several components of a personal organization system 202 (FIG. 2). Computer storage media includes volatile and nonvolatile, removable and non-removable media implemented in any method or technology for storage of information such as computer readable instructions, data structures, program modules, or other data. Memory 704, removable storage 708, and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information, such as the out of office assistant software or the out of office message data structure 300 (FIG. 3), and which is accessed by device 700 and processor 702 on the client computer. Any such computer storage media may be part of device 700.

Device 700 may also contain communications connection(s) 712 that allow the device to communicate with other devices. In embodiments, the communication connections 712 are used to receive email messages with an messaging service executed on a server that is accessed over a network, such as the Internet, that receives the messages and parses data from the message, for example, the sender, and that replies with an out of office message to the sender of the message. In still other embodiments, an out of office assistant 718 is loaded into system memory 704 or stored into removable storage 708 or non-removable storage 710 from a server accessed using the communication connections 712.

Communications connection(s) 712 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired, connection, and wireless media such as acoustic, RF, infrared, and other wireless media.

In embodiments, device 700 includes a graphical user interface 722 that includes input devices 714 and output devices 716. Data selections for an out of office assistant 718, in embodiments, are selected with user input device(s) 714, and the intervals are displayed with output device(s) 716. Input device(s) 714 are also referred to as user interface selection devices and include, but are not limited to, a keyboard, a mouse, a pen, a voice input device, a touch input device, etc. Output device(s) 716 are also referred to as displays and include, but are not limited to, cathode ray tube displays, plasma screen displays, liquid crystal screen displays, speakers, printers, etc. These devices, either individually or in combination, form the graphical user interface 722 used to display the intervals as described herein. All these devices are well know in the art and need not be discussed at length here.

Computer system 700 typically includes at least some form of computer readable media, which is some form of computer readable medium. Computer readable media can be any available media that can be accessed by processing unit 702. By way of example, and not limitation, computer readable media comprise computer storage media and communication media. Out of office assistant 718 comprises such modules or instructions executable by computer system 700 that may be stored on computer storage medium and other tangible mediums and transmitted in communication media. Computer storage media includes volatile and nonvolatile, removable and non-removable media implemented in any method or technology for storage of information such as computer readable instructions, data structures, program modules, or other data. Combinations of the any of the above should also be included within the scope of computer readable media.

In some embodiments, computer system 700 is part of a network that stores data in remote storage media for use by the computing system 700. In embodiments, an out of office assistant 718 executing on a client system may access the remotely stored data to generate out of office messages for the remotely stored data. In other embodiments, the computing system 700 is a desktop or similar computer that stores and operates the out of office assistant 718 on local client data stored in a local storage medium. In still other embodiments, the out of office assistant 718 is executed remotely on a server computer system, wherein out of office messages are returned to a client computer system but not generated on the client computer system.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present invention. Therefore, the specific structure, acts, or media are disclosed only as illustrative embodiments. The invention is defined by the appended claims.

What is claimed is:

1. A computer system comprising:
  at least one processing unit; and
  at least one memory storing computer-readable instructions that when executed by the at least one processing unit cause the computer system to:
    receive an indication to activate an out of office messaging function via a setup window;
    receive input for a first out of office message;
    receive a selection to send the first out of office message; and
    upon exiting the setup window, display an indication that the out of office messaging function is active.

2. The computer system of claim 1, further comprising:
  receive a start date and an end date for the first out of office message.

3. The computer system of claim 2, wherein the indication that the out of office function is active is displayed from the start date to the end date.

4. The computer system of claim 1, further comprising:
  receive a calendar entry having a start time and an end time; and
  display the indication that the out of office function is active from the start time to the end time.

5. The computer system of claim 1, further comprising:
  receive a selection to send the first out of office message only to a first group of recipients.

6. The computer system of claim 5, wherein the first group of recipients are contacts of a user.

7. The computer system of claim 5, wherein the first group of recipients are members of a user's organization.

8. The computer system of claim 5, further comprising:
  receive an email from a first recipient who is not a member of the first group of recipients, wherein the first out of office message is not sent to the first recipient.

9. The computer system of claim 1, further comprising:
  receive input for a second out of office message; and
  receive a selection to send the second out of office message to a second group of recipients.

10. The computer system of claim 9, wherein the second group of recipients are outside of a user's organization.

11. The computer system of claim 10, further comprising:
  receive a selection to send the second out of office message only to contacts of a user.

12. The computer system of claim 11, further comprising:
  receive an email from a second recipient who is outside of the user's organization and who is not a contact of the user, wherein the second out of office message is not sent to the second recipient.

13. A handheld computer system comprising:
  at least one processing unit; and
  at least one memory storing computer-readable instructions that when executed by the at least one processing unit cause the handheld computer system to:
    receive an indication to activate an out of office messaging function via a setup window;

receive input for a first out of office message;
receive a start date and an end date for the first out of office message; and
upon exiting the setup window, display an indication that the out of office messaging function is active.

14. The handheld computer system of claim 13, wherein the indication that the out of office function is active is displayed from the start date to the end date.

15. The handheld computer system of claim 13, further comprising:
receive a calendar entry having a start time and an end time; and
display the indication that the out of office function is active from the start time to the end time.

16. The handheld computer system of claim 13, further comprising:
receive input for a second out of office message; and
receive a selection to send the second out of office message to a second group of recipients.

17. The handheld computer system of claim 16, wherein the second group of recipients are outside of a user's organization.

18. The handheld computer system of claim 17, further comprising:
receive a selection to send the second out of office message only to contacts of a user.

19. The handheld computer system of claim 18, further comprising:
receive an email from a second recipient who is outside of the user's organization and who is not a contact of the user, wherein the second out of office message is not sent to the second recipient.

20. A computer implemented method of configuring an out of office message for a user's email account, the method executed on a computer having at least one memory and at least one processing unit, the method comprising:
receiving an indication to activate an out of office messaging function via a setup window;
receiving input for a first out of office message;
receiving a selection to send the first out of office message; and
upon exiting the setup window, displaying an indication that the out of office messaging function is active.

* * * * *